April 12, 1932. J. E. FLETCHER 1,853,120
CUPOLA AND LIKE FURNACE
Original Filed May 19, 1930

J. E. Fletcher
INVENTOR

By Marks & Clerk
Attys.

Patented Apr. 12, 1932

1,853,120

UNITED STATES PATENT OFFICE

JOSEPH ERNST FLETCHER, OF DUDLEY, ENGLAND, ASSIGNOR OF ONE-HALF TO THE BRITISH CAST IRON RESEARCH ASSOCIATION, OF BIRMINGHAM, ENGLAND

CUPOLA AND LIKE FURNACE

Original application filed May 19, 1930, Serial No. 453,777, and in Great Britain May 24, 1929. Divided and this application filed October 6, 1931. Serial No. 567,226.

This invention relates to the cupola furnaces employed for melting cast iron, steel, wrought iron or other metals, and in some cases slags, in which air is admitted through tuyères near the bottom of the furnace.

In particular the invention relates to cupolas in which in addition to the main tuyères situated adjacent to the melting zone, there are supplementary tuyères of smaller cross section than the main tuyères, whereby air can be admitted to the interior of the cupola at positions above the main tuyères.

When main and supplementary tuyères are employed in combination and regulating valves are provided on both tuyères much difficulty has been experienced in obtaining proper regulation of the air to the different parts of the cupola, and it has been found impossible by regulation of both the main and supplementary tuyères to obtain the best control and distribution of the air required for the most efficient operation of the cupola. The object of the present invention is to overcome this difficulty in a simple and convenient manner.

The present invention comprises the use of main and supplementary tuyères, and air regulating means acting on the main tuyères only.

Also the invention comprises the use of main and supplementary tuyères, and air regulating means in the form of axially movable ball or equivalent valves co-operating with annular seatings at the entrances of the main tuyères and accessible for adjustment from the exterior of the cupola.

Further the invention comprises the use with the main tuyères, where main and supplementary tuyères are used, of valves each containing an opening or passage through its interior.

This application is a division of my copending application, Serial No. 453,777, filed May 19, 1930.

In the accompanying sheet of explanatory drawings:—

Figure 1:
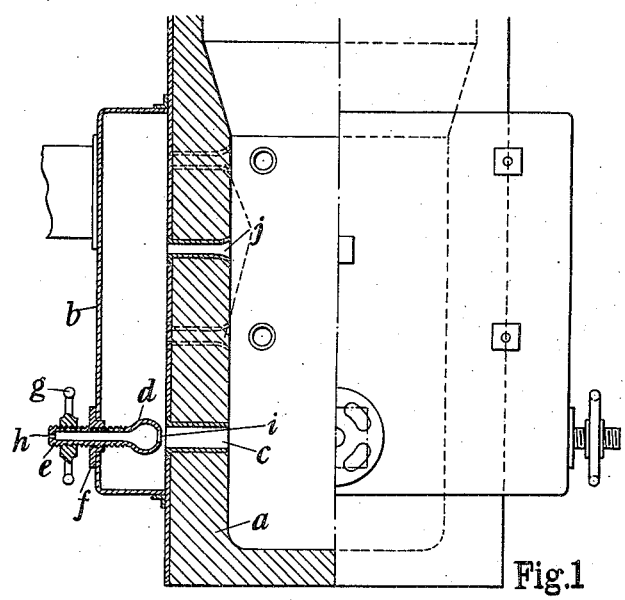
Figure 1 is a diagram (with one half in section) showing one means of carrying the invention into effect.

In carrying the inventin into effect as shown in Figure 1, the cupola $a$ is surrounded by a wind chest $b$. Adjacent to the lower part of the cupola and in direct communication with the wind chest are arranged a number of main tuyères $c$. Opposite the outer end of each tuyère is arranged a hollow spherical valve $d$ by which the amount of air entering the tuyère can be conveniently regulated. The valve is formed with a screwed hollow stem $e$ which passes through a screwed plate $f$ on the wind chest. The stem can be rotated by a handle $g$. Apertures $h$, $i$, at the opposite ends of the stem enable the interior of the cupola to be inspected.

At convenient positions above the main tuyères are arranged, preferably in direct communication with the wind chest, supplementary tuyères $j$.

Figure 2:
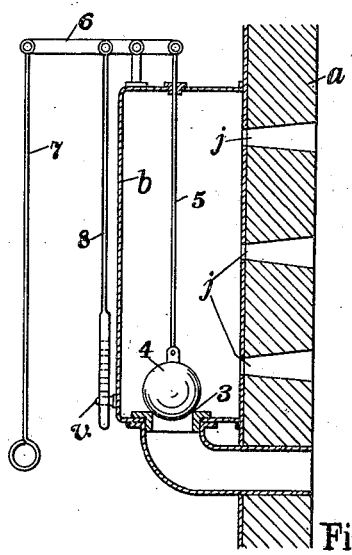
Figure 2 is a diagram illustrating alternative means.

In the modification shown in Figure 2 the outer end of the main tuyère $c$ is formed with a bend or elbow terminating in a horizontal annular seating 3 in the bottom of the wind chest $b$. In conjunction with this seating is arranged a ball valve 4 which can be raised or lowered by a rod 5 connected to a lever 6. The latter is actuated by a handle 7 and is secured by a rod 8 engaging a peg $v$.

By means of the valves $d$ or 4 the quantity of air supplied through the main tuyères can be accurately adjusted to suit the conditions obtaining in the furnace, and thereby excessive oxidation of the metal is avoided and the quantity of solid fuel required is economized. By operating with a suitably restricted air supply at the main tuyères the gas resulting from the retraction in the melting zone may consist mainly of carbon monoxide, and this is consumed at a higher position in the furnace by air admitted through the supplementary tuyères. Preferably, when two or more rows of supplementary tuyères are used, the tuyères in any row alternate with those of the adjacent row or rows.

By this invention, which consists essentially in effecting the air regulation by means of valves as above described acting on the main tuyères only, an important advantage is obtained, in that the relative proportions of air passing into the cupola through the main and supplementary tuyères are automatically varied. Both sets of tuyères derive their air from the same wind chest. When the main tuyères are fully open the greater part of the air enters the cupola through the main tuyères. On restricting the air supply to the main tuyère, the amount supplied to the supplementary tuyères is automatically increased. Consequently on diminishing the air supply to the lower part of the cupola and thereby setting up a condition favourable to the production of carbon monoxide, the more air is admitted through the supplementary tuyères to the higher parts of the cupola where it is required to convert the carbon monoxide to carbon dioxide. By means of valves as above described the desired regulation of the main air supply can be effected in a satisfactory manner at any time and while the cupola is in operation.

When it is required to burn away slag deposits which have accumulated in the region of the main tuyères the valves controlling the main tuyères are closed completely.

Having thus described my invention what I claim as new and desire to secure by Letters Patent is:—

The process of operating a cupola or like furnace having a wind chest and lower main tuyères and upper supplementary tuyères in said wind chest, which comprises regulating the size of the openings in the main tuyères to suit the condition of the furnace and keeping wide open at all times the supplementary tuyères, relying entirely on the automatic change of pressure in the chest caused by the variation in the effective openings of the main tuyères to regulate the amount of air passing through the supplementary tuyères.

In testimony whereof I have signed my name to this specification.

JOSEPH ERNST FLETCHER.